UNITED STATES PATENT OFFICE.

JOHN W. W. TINDALL, OF LIVERPOOL, ENGLAND.

IMPROVEMENT IN DEODORIZING PETROLEUM, &c.

Specification forming part of Letters Patent No. 38,069, dated March 31, 1863.

*To all whom it may concern:*

Be it known that I, JOHN WILLIAM WARD TINDALL, of Liverpool, in the county of Lancaster, England, have invented an improved process of deodorizing paraffine, coal, pitch, rock, and other oils and hydrocarbons, of which the following is a full, clear, and exact description.

My invention is particularly applicable to deodorizing those natural oils which flow from the earth or are extracted therefrom in certain localities, and which have such a powerful and offensive odor as to unfit them for many uses and purposes to which they would otherwise be applicable.

To enable others skilled in the art to understand my invention, I will proceed to describe the manner in which I have carried it out.

My process varies somewhat with oils containing paraffine and those which do not. Where the oil contains paraffine, I add to the quantity of oil which is to be treated at the rate of four ounces, by weight, of commercial sulphuric acid for each gallon of the oil. The sulphuric acid is simply run into the oil contained in a suitable vessel. The oil is then allowed to stand for about ten minutes, when heat is to be applied to it, so as to raise its temperature to about 115° of Fahrenheit, which temperature is retained for about ten minutes, when the application of heat may cease, unless the temperature should fall materially during a period of about one hour and forty minutes, during which time the oil is kept well stirred. If the temperature fall, then it is desirable that heat should be again applied to keep up the temperature as near as may be to the degree above mentioned. At the end of this time the oil generally will have ceased to give off offensive, pungent, and choking vapors. If such should not be the case, the stirring is to be continued for a further time. Nitric or nitrous acid is now to be added in the proportion of about one and a half ounce, by weight, of the acid to each gallon of oil, and the temperature is allowed to fall to about 105° Fahrenheit, and to be kept as near as may be at that point for about an hour, during which time the oil is to be constantly stirred. A pint and a half of urine is now added to each gallon of oil, the stirring to be continued and the temperature maintained for a further space of half an hour, or thereabout, at 105° Fahrenheit. Commercial hydrochloric acid is now added in the proportion of one and a half ounce, by weight, to each gallon of oil, the stirring and the temperature of 105° being continued for the space of another hour, at the end of which time it will be found that the oil is not only entirely divested of its disagreeable odor, but that it has an agreeable odor imparted to it, which odor is further developed by the subsequent operations of washing and distilling.

To make the oil still further merchantable, it may be bleached by stirring in two ounces of chloride of lime to each gallon of oil, or, in place thereof, one pound of Fuller's earth or clay. If the oil is to be immediately distilled, the whole mixture is placed in a still—such as is ordinarily used in distilling such mineral oils and hydrocarbons—and the same is to be distilled and washed in the usual manner. If the oil is to be stored or to be sent to a distance without first undergoing distillation, it is to be well washed in water, after which it is placed in suitable casks, and may be used in this state for many purposes. It may also be transported or stored without the danger of impregnating the ships or storehouses with its odor, or of destroying or injuring other merchandise with which the oil or the packages which contain it may come in contact. When thus prepared, the oil may be distilled at any time. When it is to be had, sea-water is to be preferred for the purpose of washing the oil.

When treating mineral oils and hydrocarbons which do not contain paraffine, I find it desirable to increase the quantity of chloride of lime to four ounces, by weight, to each gallon of oil, and I stir in four ounces of animal-charcoal to the gallon and let it remain half an hour before applying the nitric or nitrous acid, as above explained. In other respects the process is conducted as above described.

In the above description I have been particular to give my process exactly as I have practiced it to best advantage; but I do not confine myself to the precise details, either as respects the proportions of the materials used or the periods of time occupied in the separate steps of the process, or the order in which the separate steps are taken, as these may be varied to some extent without changing the result.

For the most perfect attainment of the object which I have in view, I employ all three of the acids named—that is, the sulphuric, hydrochloric, and nitric, (or nitrous;) but a tolerably satisfactory result may be had without the hydrochloric acid. It is essential, however, under all circumstances, to make use of the urine, as this forms the ground-work of my invention.

I would also state that the deodorizing process may be employed without bleaching the oil where its color is not objectionable, though the oil is always more or less bleached by the deodorizing process.

What I claim as my invention, and desire to secure by Letters Patent as an improvement in the deodorizing of mineral and other oils, is—

The employment of urine in combination with mineral acids, as described, for the purpose set forth.

J. W. W. TINDALL.

Witnesses:
SAM. COOPER,
P. E. TESCHEMACHER.